(12) United States Patent
Vogel et al.

(10) Patent No.: US 8,890,031 B2
(45) Date of Patent: Nov. 18, 2014

(54) MIG WELDER CONTROL SYSTEM AND METHOD

(75) Inventors: Bernard J. Vogel, Troy, OH (US); Kenneth A. Stanzel, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2171 days.

(21) Appl. No.: 11/412,482

(22) Filed: Apr. 27, 2006

(65) Prior Publication Data

US 2007/0251932 A1    Nov. 1, 2007

(51) Int. Cl.
*B23K 9/10*    (2006.01)
*B23K 9/067*    (2006.01)

(52) U.S. Cl.
CPC ................................ *B23K 9/0672* (2013.01)
USPC ................. 219/137.71; 219/130.4; 219/130.5

(58) Field of Classification Search
USPC .................... 219/137.71, 130.1, 130.5, 137.7
See application file for complete search history.

(56) References Cited

U.S. PATENT DOCUMENTS

| | | | | |
|---|---|---|---|---|
| 3,906,184 | A | * | 9/1975 | Gibbs et al. ............... 219/130.21 |
| 3,968,340 | A | * | 7/1976 | Fernicola .................... 219/130.4 |
| 4,109,130 | A | * | 8/1978 | Oku ........................... 219/130.21 |
| 4,608,482 | A | * | 8/1986 | Cox et al. ........................ 219/132 |
| 4,825,038 | A | * | 4/1989 | Smartt et al. ............. 219/137 PS |
| 5,057,665 | A | * | 10/1991 | Gilliland .................... 219/130.21 |
| 5,528,010 | A | * | 6/1996 | Herwig et al. .............. 219/76.16 |
| 5,689,177 | A | * | 11/1997 | Nielsen et al. ................. 323/241 |
| 5,856,920 | A | * | 1/1999 | Buda et al. ..................... 363/149 |
| 6,177,651 | B1 | * | 1/2001 | Reynolds et al. ........ 219/137 PS |
| 6,707,002 | B2 | * | 3/2004 | Rice et al. ................... 219/130.5 |
| 6,974,933 | B2 | * | 12/2005 | Rice et al. .................. 219/137.71 |
| 7,091,449 | B2 | * | 8/2006 | Ihde et al. ................. 219/137.71 |
| 2004/0188405 | A1 | * | 9/2004 | Holverson et al. ........ 219/130.51 |
| 2006/0243718 | A1 | * | 11/2006 | Enyedy .................... 219/137.71 |

FOREIGN PATENT DOCUMENTS

| EP | 1 016 484 A | 7/2000 |
|---|---|---|
| WO | WO 2006/038203 A | 4/2006 |

OTHER PUBLICATIONS

Anonymous: "Initiation" Wikipedia, The Free Encyclopedia, Online, XP002450023, Retrieved from the Internet: URL: http://en.wikipedia.org/wili/Initiation Retrieved on Sep. 7, 2007, abstract.

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A system for controlling a welding operation provides for open-loop control of voltage applied to a wire electrode during an initial arc initiation stage of operation. The voltage may be based upon an operator set voltage. Electrode wire feed speeds may be varied during the same period. The voltage may be changed, but still open-loop controlled after initial contact between the electrode and a workpiece. The control transitions from open-loop to closed loop following the arc initiation stage, which may be a fixed interval or varied based upon various factors. Closed-loop voltage control then ensues, in which voltage may be limited to values based upon the initial open-loop voltage. The voltage may be regulated by control of SCR firing angles, such as by reference to a zero-crossing of an input AC waveform.

20 Claims, 5 Drawing Sheets

MIG WELDER CONTROL SYSTEM AND METHOD

BACKGROUND

The present invention relates generally to wire-feed welding devices and to methods and apparatus for controlling such wire-feed welding devices.

A common metal welding technique employs the heat generated by electrical arcing to transition a workpiece to a molten state, followed by addition of metal from a wire or electrode. One technique that employs this arcing principle is wire-feed welding. At its essence, wire-feed welding involves routing welding current from a power source into an electrode that is brought into close proximity with the workpiece. When the electrode contacts the work piece, current flows, and an arc is established from the electrode to the workpiece, completing a circuit and generating sufficient heat to melt and weld the workpiece. Often, the electrode is consumed and becomes part of the weld itself. Thus, new wire electrode is advanced, continuously replacing the consumed electrode and maintaining the welding arc. If the welding device is properly adjusted, the wire-feed advancement and arcing cycle progresses smoothly, providing a good weld. One common type of wire-feed welding is metal inert gas or "MIG" welding.

Traditionally, operating power for generation of the electrical arc is produced by rectifying and conditioning an AC power signal. To accomplish this, traditional MIG welding devices employ silicon controlled rectifiers (SCRs) to condition and convert incoming AC power (i.e., from the power grid) into an appropriate output power. In general, the SCRs are fed an AC waveform and are switched from a non-conducting state to a conducting state at particular points along the waveform to supply voltage at a desired level to downstream circuitry, particularly to a capacitor that is charged and that ultimately supplies a DC waveform to the welding torch. As will be appreciated by those of ordinary skill in the art, the point along each half-cycle lobe of the AC waveform at which the SCRs are switched to their conductive state is commonly referred to as the "firing angle." The firing angle is often expressed as a time interval, e.g., the number of milliseconds from the current zero-crossing (i.e., the trailing zero-crossing of the half-cycle lobe) of the given AC wave form to "firing" (switching to the conducting state) of the SCR. Generally speaking, the earlier in the cycle the firing angle occurs, the greater the average output voltage through the SCRs, assuming the SCR is switched to its conducting state after the peak of the lobe.

In traditional welding systems, control of the SCR firing angle is effectuated by rigid adherence to a closed-loop, feedback control scheme, in which the firing angle varies based on the voltage output feedback returned to the controller. That is, in traditional systems, the SCR firing angle takes into account both a command or desired output voltage signal and a feedback voltage during operation, the system then constantly comparing the two and attempting to maintain the set or desired voltage. Unfortunately, the voltage feedback values of the system will vary relatively dramatically, particularly during start-up, or initiation of a weld, sometimes referred to as "arc initiation". In fact, the voltage feedback value will vary from an open circuit voltage (because no arc has been struck and no current flows through the workpiece and back to the power supply), to a short circuit voltage value once the wire electrode comes into contact with the workpiece and the arc is initiated. This variance may result in extinguishing of the welding arc or delay in establishment of the arc, or generally erratic operation, as the controller attempts to manage transitions between what it interprets as open and short circuit conditions. Moreover, this variance can lead to increased weld spatter during start-up, flaring, stumbling, torch push-back, among other problems, all of which are undesirable.

Therefore, there exists a need for improved apparatus and methods for the control of wire-feed welding devices.

BRIEF DESCRIPTION

In accordance with certain embodiments, the present invention provides control circuitry for a welding system designed to respond to such needs. In accordance with certain embodiments, the invention provides for control of a voltage applied by a welding power supply to a wire electrode in an open-loop manner during an initial arc initiation stage of operation, such as following receipt of an initializing signal (e.g., from a trigger on a welding torch). The open-loop control does not vary the applied voltage based upon sensed voltage, which will vary as the arc is established and stabilized.

The system then transitions to closed-loop control in which voltage applied to the electrode (i.e., output by the power supply) is regulated based upon the sensed voltage. A target level of voltage during closed-loop operation may be based upon or derived from the closed-loop voltage setting, which itself may be based upon an operator input. During closed-loop operation the voltage may be limited or clamped between upper and lower settings based upon the open-loop voltage.

The regulation of voltage may be based upon a "firing angle" of solid state switches, such as SCRs in the power supply. Essentially, this firing angle is a time-translated location on an input AC waveform and effectively determines the voltage along the waveform at which the switches are placed in their conducting state to supply power to downstream circuitry.

The invention also provides welding systems, as well as computer-implemented algorithms or routines for performing functionality of type set forth above.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, the present technique, in accordance with certain embodiments, provides a method and apparatus for controlling a wire feed welding device. For example, a MIG welding system incorporating the present technique can be operated such that the system operates under the direction of a predetermined SCR gating (i.e., firing) scheme during start-up of the system. Thus, in such a system, arc starting is improved, as variance of the SCR firing angle is limited during arc initiation. As discussed below, the voltage applied to the welding torch and wire is essentially controlled in an open-loop manner during an initial or arc initiation period, followed by closed-loop control of voltage thereafter. The transition to and from the open-loop phase of operation may be managed in various ways to further improve operation. The resulting operation of the system has been found to be much smoother, stable and predictable, particularly during arc initiation than in conventional systems.

Figure 1:
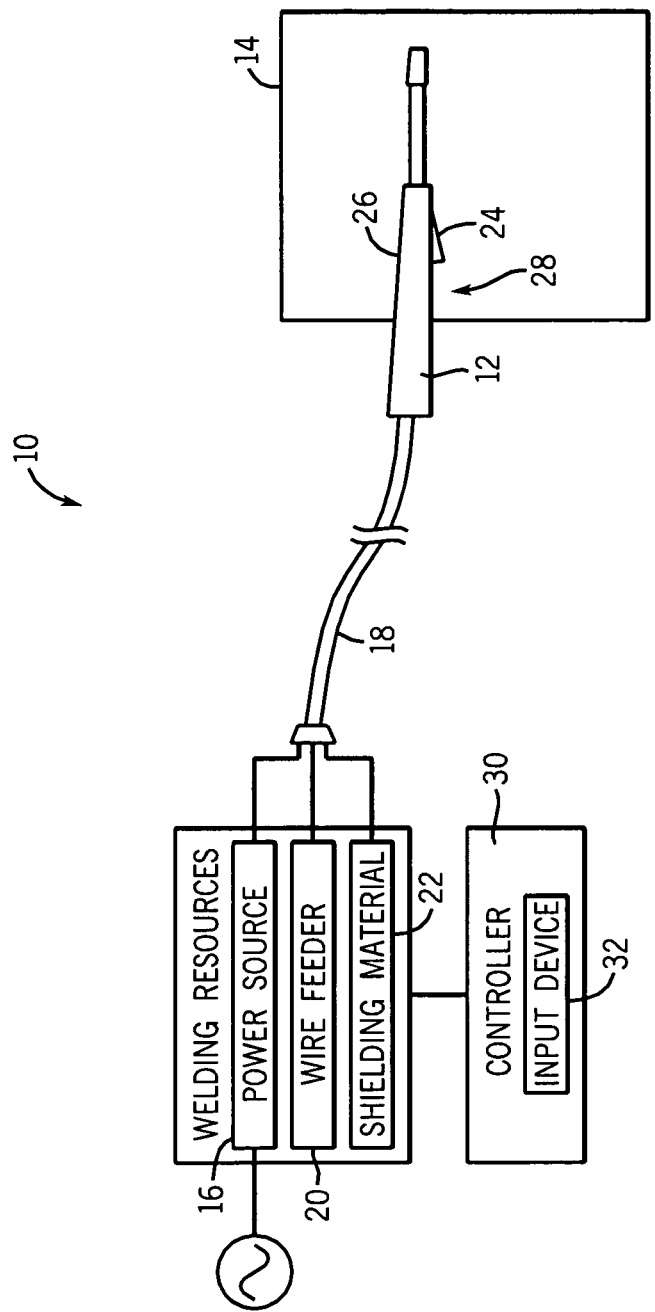
FIG. 1 is a diagrammatic representation of a wire feed welding system, in accordance with an exemplary embodiment of the present technique.

FIG. 1 illustrates an exemplary welding system 10 that includes an embodiment of this wire feed control technique. System 10 may be configured for portable use or may be part of a permanent or semi-permanent installation. Prior to continuing, it is worth noting that the following discussion merely relates to exemplary embodiments of the present technique. Thus, the appended claims should not be viewed as limited to those embodiments described herein. Indeed, the present technique is applicable to a wide variety of welding systems.

Returning to the exemplary welding system 10, it includes a welding torch 12 that defines the location of the welding operation with respect to a workpiece 14. A power source 16 converts incoming AC power to an appropriate DC power for welding. A welding cable 18 is coupled between the power source 16 and the welding torch 12. Placement of the welding torch 12 at a location proximate to the workpiece 14 allows electrical current provided by the power source 16 to be delivered to the welding torch 12 via the welding cable 18. Current then arcs from the welding torch 12 to the workpiece 14. In summary, this arcing completes an electrical circuit from the power source 16, to the welding torch 12 via the welding cable 18, through a wire electrode, to the workpiece 14, and, at its conclusion, back to the power source 16, generally to ground. This arcing generates a relatively large amount of heat causing the workpiece 14 and/or filler metal of the electrode to transition to a molten state, facilitating the weld.

To produce electrical arcing, the exemplary system 10 includes a wire feeder 20 that provides a consumable wire electrode to the welding cable 18 and, in turn, to the welding torch 12. The welding torch 12 conducts electrical current to the wire electrode via a contact tip (not shown) located in the neck assembly, leading to arcing between the egressing wire electrode and the workpiece 14.

To shield the weld area from contaminants during welding, to enhance arc performance, and to improve the resulting weld, the exemplary system 10 includes a gas source 22 that feeds an inert shielding gas to the welding torch 12 via the welding cable 18. It is worth noting, however, that a variety of shielding materials, including various fluids and particulate solids, may be employed to protect the weld location.

Advancement of these welding resources (e.g., welding current, wire-electrode, and shielding gas) is effectuated by actuation of a trigger 24 secured to a handle 26. By depressing the trigger 24, as indicated by arrow 28 in the figure, a switch disposed within the trigger 24 is closed, causing the transmission of an electrical signal that commands delivery of the welding resources through the welding cable 18. Additionally, the welding system 10 includes a controller 30, which effectuates control of the welding resources. To facilitate adjustment of operating parameters of the welding system 10, the controller includes one or more input devices 32, which are discussed further below.

Figure 2:
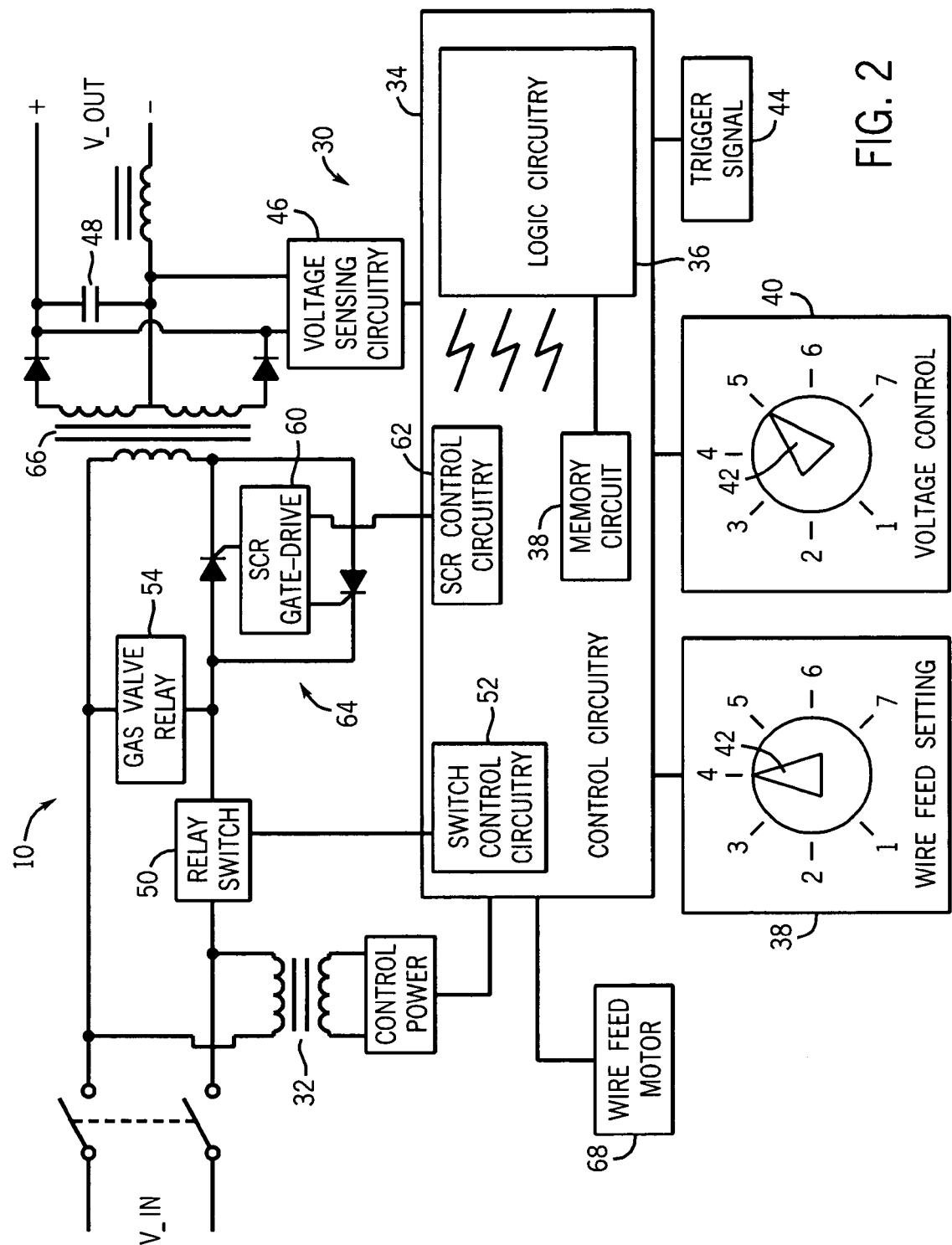
FIG. 2 is a schematic representation of a wire feed welding system control, in accordance with an exemplary embodiment of the present technique.

FIG. 2 is a simplified schematic of welding system controller 30 in relation to various other components of the welding system 10. As illustrated, the exemplary controller 30 includes main control circuitry 34 that receives inputs, processes these inputs, and provides output commands to the welding system 10. To effectuate this control, the main control circuitry includes a central logic circuit 36, such as a processor or programmable logic controller (PLC). The central logic circuit 36 communicates with a memory circuit 38, which stores operational data as well as operator-provided data or settings. Moreover, the exemplary main control circuitry 34 receives control power, which is conditioned to an appropriate level from the main power input (V_IN) by a control power transformer 32. The main control circuitry 34 may determine the waveform, and thus, zero-crossing points of the input power (V_IN) via the input control power or via a separate input signal, and use these identified points as discussed further below.

The exemplary controller 30 receives inputs from a wire feed speed controller or input device 38 and a voltage controller or input device 40. As illustrated, these input devices may include potentiometers, although other kinds of input devices, such as keypads, are envisaged. Each input device 38 and 40, in the illustrated embodiment includes a knob 42 that is positionable between indexed locations that correspond with certain operational parameters (e.g., speeds and voltage levels).

For example, in the illustrated welding system 10 shown in FIG. 1, the power source 16 provides output power (V_OUT) within the operational range of 10 to 40 volts. An operator can control the output voltage to the wire electrode by turning the knob 42 on the voltage controller 40 between the indexed positions, which are labeled from "1" to "7". If a voltage closer to 40 V is desired, the knob 42 can be turned toward the "7" position. Conversely, if lower output voltage is desired, the knob 42 on the voltage controller 40 can be turned toward the "1" position. Similarly, the wire feed speed of the system 10 can be adjusted by rotating the knob 42 of the wire feed speed controller 38 between the "1" and "7" positions, with the "1" position being a lowest operating wire feed speed (e.g., 75 inches per minute) and "7" being the fastest (e.g., 1400 inches per minute).

The controller 30 also receives inputs from the trigger 24 (see FIG. 1). As discussed above, depressing the trigger 24 activates a switch that transmits an activation signal to the controller 30. At this point, the activation or trigger signal, designated by reference numeral 44 in FIG. 2, is transmitted to and received by the main control circuitry 34, signifying that an operational state is desired. Of course, when the trigger signal 44 is removed, the welding system 10 transitions to a deactivated or non-operational state. Furthermore, the main control circuitry 34 receives input from voltage sensing circuitry 46, which, as discussed further below, provides feedback information to the main control circuitry 34 regarding the levels outputted by the power source 16 (see FIG. 1) during operation. That is, voltage sensing circuitry 46 senses the V_OUT voltage of the system 10. As illustrated, the voltage sensing circuitry measures the voltage across a dampening capacitor 48.

In view of these inputs, the logic circuitry 36 of the main control circuitry 34 commands various components of the welding system 10. For example, it commands a relay switch 50 through switch control circuitry 52. By activating the relay switch 50, a signal is sent to a gas valve relay 54, which opens or closes a gas valve to activate or deactivate the flow of shielding material (e.g., gas) from the shielding material source 22 (see FIG. 1). Additionally, the main control circuitry 34 controls an SCR gate driver 60 through SCR control circuitry 62. Specifically, the SCR control circuitry 62 of the main control circuitry 34 provides the desired firing angle to the SCR gate driver, and this firing angle controls the output power to the welding cable 18 (see FIG. 1). Thus, main power (V_IN), which is routed through the SCR assembly 64, is conditioned by main transformer 66 and routed downstream where it is rectified and provided for operational use by the welding system 10. In summary, the output voltage (V_Out) is provided to the welding electrode for arcing and its magnitude is generally determined by switching of the SCR assembly 64, which is controlled, at least partially, by the voltage control input device 40. The main control circuitry 34 also controls a wire feed motor 68, which drives and regulates the advancement and rate of advancement of wire electrode into the welding cable 18 by wire feeder 20 (see FIG. 1).

It should be noted that, throughout the present discussion, reference is made to "SCRs" as the devices used to selectively supply power to downstream circuitry, and ultimately to determine the amplitude of voltage supplied for welding. While the use of these particular solid state switches is part of a present embodiment, other switching devices could be used in their place, such as insulated gate, bipolar transistors (IGBTs), as well as, potentially, still further devices. The use of such devices would nevertheless generally follow the teachings provided herein, particularly during an arc initiation phase of welding operation.

Figure 3:
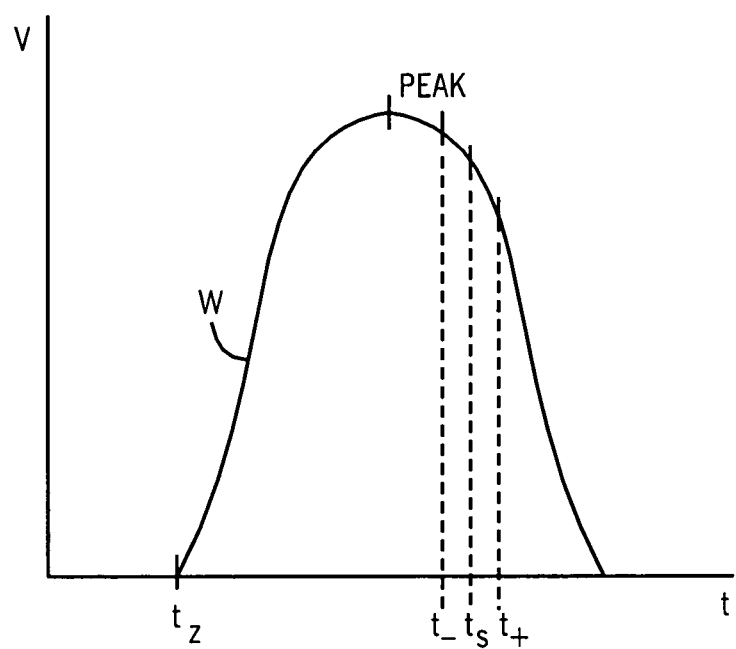
FIG. 3 is an exemplary half-cycle of an AC waveform illustrating the concept of "firing angle" used for switching the SCRs of the system illustrated in FIG. 2.

FIG. 3 is a graphical illustration of one half of an AC waveform that is supplied to the SCRs, and provides insight into the meaning of the open and closed loop control of the "firing angle" and other control provided by the invention. As shown in FIG. 3, the waveform W will exhibit a convention sinusoidal shape (only one half of the full waveform cycle is shown). The firing angle represents the time, typically measured from the trailing zero-crossing ($t_z$) at which one of the SCRs (depending upon the polarity of the waveform lobe) is placed in its conducting state. The maximum voltage is provided at the high-point of the half wave lobe. However, switching is typically performed along the trailing slope of the lobe, as indicated at time $t_s$. This point will be selected in an open-loop manner during one portion of the arc initiation phase of welding in accordance with the invention, followed by closed-loop control thereafter.

The switching of the SCRs at selected locations or times along the waveform effectively regulates the voltage applied to the downstream rectifying elements and then to the capacitor 48. The capacitor is charged to the voltage provided by the SCRs, which is somewhat smoothed or filtered (i.e., generally a DC waveform), and then provided to the torch for welding.

It should also be noted that in accordance with certain presently contemplated embodiments, a relatively high, or even maximal voltage is provided during initial arcing, meaning that the firing angle is close to the peak of the lobe. It should also be noted that, as described below, even after transition to closed-loop operation, the fluctuation of the voltage may be limited or clamped between set limits, which may be set based on the closed-loop firing angle, as indicated by times $t_-$ and $t_+$. As discussed below, this further contributes to the stability of the voltage control and thus to the stability of the arc.

Figure 4:
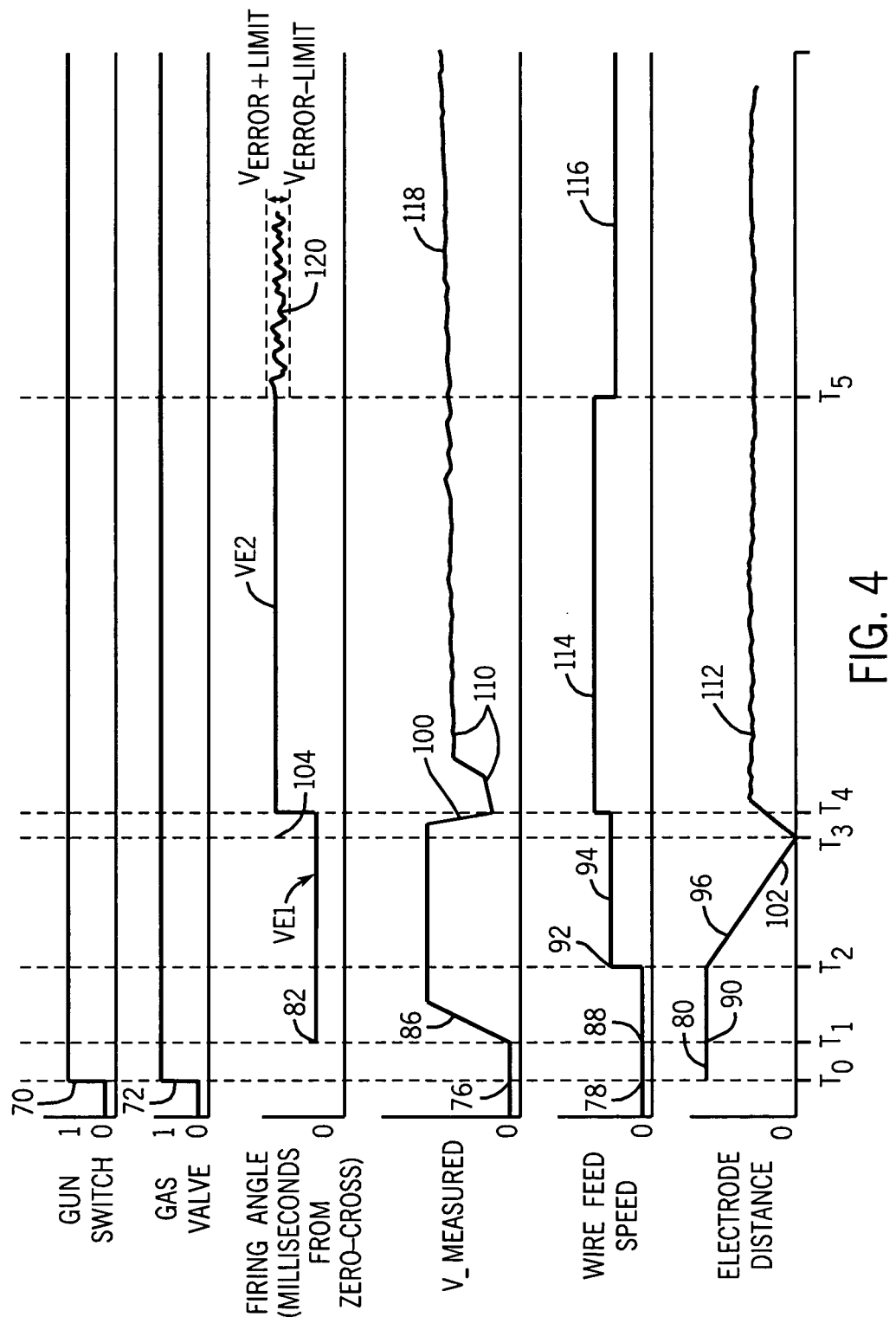
FIG. 4 is a timing diagram for operation of a wire feed welding system, in accordance with an exemplary embodiment of the present technique.

FIG. 4 represents a timing diagram for operation of the exemplary welding system 10 under the control of the circuitry described above. At time $T_0$, an operator activates the trigger 24 (see FIG. 1), which, as represented by numeral 70, transmits trigger signal 44 to the control circuitry and begins the welding (i.e., arc starting) process. As discussed above, depressing the trigger 24 also activates the gas valve relay 54, which initiates the flow of shielding gas. This initiation of flow is represented by reference numeral 72. However, the activation of the gas flow may be slightly delayed, such as to coincide with the zero-crossing of the input AC power (V_IN). Also at $T_0$, the SCR gate drive 60 is off (i.e., the SCRs are in their non-conducting state), and no output voltage (V_OUT) is provided. Consequently, no measured voltage (V_MEASURED) is sensed by the voltage sensing circuitry 46, as represented by reference numeral 76. Moreover, the wire feed motor 68 is not activated, and thus, the wire feed speed is zero and the distance of the wire electrode from the work-piece 14 is at a maximum (as regulated by the welder holding the torch), as represented by reference numerals 78 and 80, respectively.

After a short time delay (e.g., 30 milliseconds), the events illustrated at time $T_1$ occur. Specifically, at time $T_1$, an activating firing angle (VE1) is set for the SCR assembly 64, as represented by reference numeral 82. Generally, as noted above, this activating firing angle is generally set at a time delay from the zero-crossing of the AC waveform to provide a higher output voltage (V_OUT) by gating the SCR assembly 64 ON for a greater length of the given half-cycle of the AC waveform (i.e., nearer the peak of each half-wave lobe). Thereafter, the voltage across capacitor 48 will begin to increase as the capacitor is charged. Setting the voltage higher at this stage facilitates quick charging of capacitor 48. As represented by numeral 86, the capacitor 48 will charge until it reaches equilibrium with the voltage applied to it, the voltage across the capacitor 48 being measured by the voltage sensing circuitry 46 and being represented as the value V_MEASURED in the diagram. Additionally, the wire feed motor 68 remains deactivated, leaving the wire feed speed at zero and the distance of the welding wire electrode from the workpiece at a maximum, as represented by numerals 88 and 90, respectively.

It should also be noted that the voltage provided by controlled switching of the SCRs during this stage of operation is open loop, that is, does not depend upon the voltage feedback value V_MEASURED. It should also be noted that in certain embodiments, a lower voltage may be used during this initial stage, such as the reduced voltage discussed below or even a level based upon the operator setting, although the higher initial voltage is believed to aid in initial arcing. In a present embodiment, the capacitor 48 charges in a few half-cycles.

Subsequently, at time $T_2$, which may be, for example, 25 to 40 milliseconds after $T_1$, the main control circuitry 34 activates the wire feed motor 68, beginning advancement of the wire electrode, as represented by reference numeral 92 in the timing diagram. As illustrated, the wire feed speed is set at a value generally below the value set by the operator via the wire feed speed input device 38. For example, if the wire feed speed input 38 is set at "4," then the wire-feed speed at time $T_2$, will be 75% of the speed corresponding with the "4" setting, as represented by the level indicated by reference numeral 94. Of course, the wire feed speed at this time may be set at the actual operator input rate or at percentages less than or greater than the exemplary 75% setting. Because the wire feed motor 68 has been activated at $T_2$, the wire electrode begins advancing toward the workpiece, thus decreasing the distance therebetween, as represented by reference numeral 96.

Upon contact of the advancing wire electrode and the workpiece 14 arcing between the advancing wire electrode and the workpiece begins to occur. This arcing is sensed by the voltage sensing circuit 46 and evidenced by the as a precipitous drop in the measured output voltage (V_MEASURED), as represented by reference numeral 100 in the timing diagram. When the wire electrode contacts the workpiece 14, as represented by reference numeral 102, which occurs at time $T_3$, or shortly thereafter as sensed by the precipitious drop in the measured output voltage (V_MEASURED), the main control circuitry 34 effectuates a step change in the firing angle of the SCR assembly, as represented by reference numeral 104. It should be noted that this same level of voltage could have been already selected if the higher initial charging voltage discussed above had been replaced with this second open-loop voltage setting. In practice, contact between the wire electrode and the workpiece 14 can be measured by monitoring the output voltage value across the capacitor 48 (V_MEASURED), as in the illustrated example, by monitoring the output voltage (V_OUT), by monitoring the output current in the wire electrode, such as via a Hall Effect sensor, among other well know techniques. As another technique for detecting contact of the wire-electrode with the workpiece 14, a threshold voltage set, for instance, 2 volts below the open circuit voltage of the system may be employed. Thus, when the open circuit voltage of the system is detected by the main control circuitry 34 and stored in the memory circuit 38, the threshold voltage is established at a level 2 volts below this detected value. In turn, when a drop in the voltage equaling or exceeding this threshold value is detected, the main control circuitry 34 concludes that the wire electrode has contacted the workpiece, and adjusts accordingly.

Figure 5:
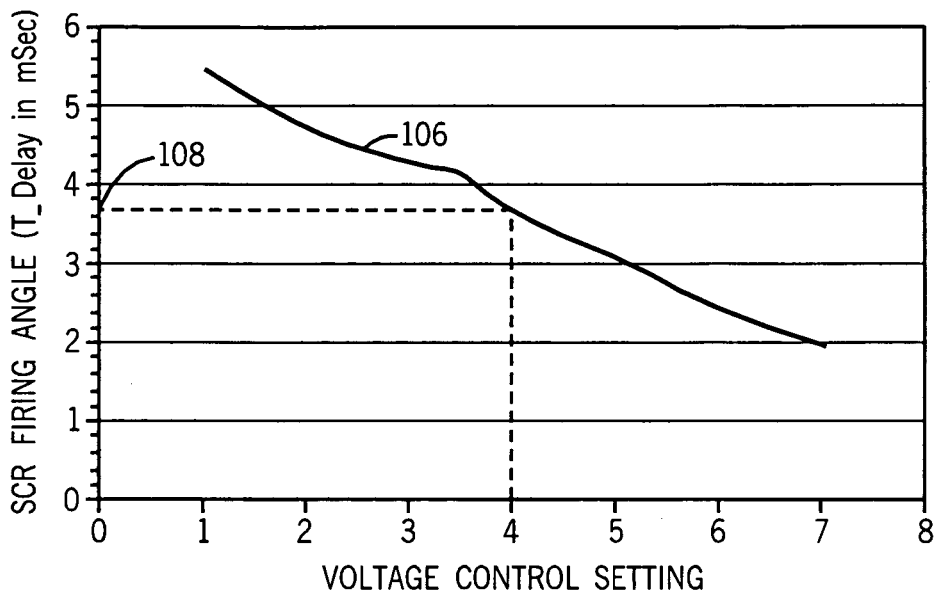
FIG. 5 is a graphical representation of a relationship between a voltage control setting and a corresponding SCR firing angle value, in accordance with an exemplary embodiment of the present technique.

At time $T_3$, or shortly thereafter, the main control circuit determines a second or initiating firing angle (VE2) for the SCR assembly. In the exemplary system 10, this initiating firing angle is established based upon the input value or setting of the voltage input device 40, which may be established by analyzing empirical data and trial results. FIG. 5 graphically illustrates a relationship between firing angle and voltage input setting, with the firing angle being represented as milliseconds of delay from the zero-crossing of a half-cycle of an AC waveform.

By way of an example, it is believed that for certain wire electrodes and operating conditions, the output voltage (V_Out) can be correlated with typical output current levels. For instance, empirical analysis of welding systems may reveal that for a given output current (I_Out) there is a normal output voltage that represents typical welding conditions. For example, at 50 Amps of output current, the desired output voltage may be 16.5 Volts, established by the relationship:

$$V\_Out=14\text{ Volts}+0.05(I\_Out)$$

Based on this exemplary relationship between voltage and current, it is believed that an SCR firing angle relationship can be empirically established by operating the welding system 10 on a fixed load at various output voltage settings. Thus, for any given voltage setting on the voltage controller 40, there is a corresponding nominal or initiating firing angle that generates the desired voltage output. Again, FIG. 5 is a graphical representation of this relationship, which is represented by trace 106. For example, if the voltage control 40 at an output current of 50 Amps is set at "4," the exemplary relationship indicates that the nominal firing angle fires approximately 3.5 milliseconds after the zero-crossing of the half-cycle of the AC wave form, as represented by level 108 in FIG. 6. If estimated as a linear relationship, trace 106 in the illustrated example could be reduced to the follow relationship:

$$\text{Time Delay(Firing Angle)}=6.1(\text{mSec})-0.6(\text{Voltage Control Setting}),$$

wherein the Voltage Control Setting varies between 1 and 7, as illustrated.

Thus, in the exemplary system, if the voltage control setting is "4," at time $T_3$ or shortly thereafter, system 10 adjusts the firing angle to approximately 3.5 milliseconds after the zero-crossing of the AC waveform, as determined above. This nominal or initiating firing angle (VE2) is maintained for a desired interval, even if voltage changes (V_MEASURED) are detected, as represented by the upwardly sloping lines 110 between times $T_2$ and $T_5$. That is, the firing angle, and consequently the voltage output by the SCRs is controlled in an open-loop manner. Additionally, the initiating firing angle (VE2) is maintained even if an arc is initiated, the initiated arc being indicated by the somewhat erratic line segment 112 (somewhat erratically varying distance between the electrode tip and the workpiece) between $T_4$ and $T_5$. Moreover, at time $T_4$, which may be, for example, 4 to 5 milliseconds after $T_3$, the main control circuitry 34 increases the wire feed speed, typically to a level above that set on wire feed speed input 38 by the operator, such as 110% of the set wire feed speed, (represented by line 114). The initiating firing angle (VE2) is maintained until time $T_5$, which may be, for example, 400 to 500 milliseconds after $T_3$ or $T_4$. Similarly, the increased wire feed speed is also maintained until time $T_5$.

It is believed that maintaining the SCR firing angle at a fixed level in an open-loop manner and maintaining the wire feed speed at an elevated rate, improves the ability of a stable arc to be established and a weld pool to form. Moreover, it is believed the foregoing technique reduces the likelihood of "flaring," which can negatively impact the weld. However, it is worth noting that for certain welding conditions, such as at higher preset valves for the wire feed speed (e.g., "6" or "7" settings on the wire feed speed input 38) or for large diameter wire electrodes, elevation of the wire feed speed from the selected rate may not be as beneficial.

At time $T_5$, welding system 10 enters into a more "steady state" condition as the arc has been initiated for a period of time. Thus, at time $T_5$, the exemplary welding system 10 reduces the wire feed speed to the value corresponding with the controller setting, as represented by segment 116. Also, at this time, the measured voltage (V_MEASURED) will remain relatively constant, as the produced arc is stable, as represented by segment 118. Moreover, at time $T_5$, the firing angle of the SCR assembly 64 is allowed to vary from the predetermined initiating firing angle, as represented by more varying line segment 120. For example, the firing angle may be allowed to vary by ±1.5 milliseconds, based on the V_MEASURED value. That is, the main control circuitry 34 may adjust the firing angle based on a comparison of the expected voltage value set by the input device 38 and the measured value (V_MEASURED), with the adjustments remaining within the bounds set by a limiting device. However, if an abnormal condition occurs, such as an arc that extinguishes, the welding system may return to the initial state, at which point the firing angle is again temporarily clamped at the predetermined nominal or initiating firing angle. That is, following time $T_5$, control becomes closed-loop. The transition between open-loop operation and closed-loop operation may be a step, but it may be preferable to smoothly transition between these stages of arc initiation, such as by implementing a sloped voltage transition until the closed-loop steady state level is obtained. Even during the closed-loop stage (i.e., normal welding after arc initiation), however, the voltage may still be held between the desired upper and lower limits determined by the clamped firing times to avoid large variations in voltage and thereby to stabilize and smoothen the welding operation. In addition the transitions between the various wire feed speeds indicated in FIG. 4 may be implemented as a step as shown or may be implemented as a sloped transition.

Figure 6:
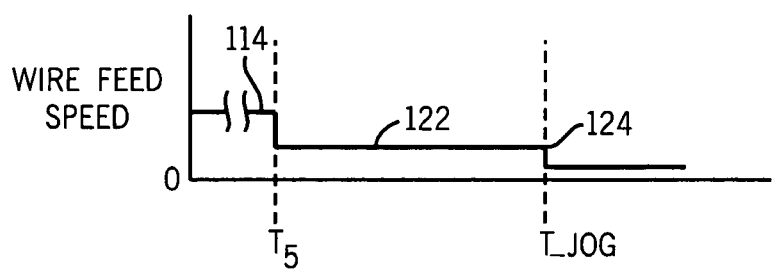
FIG. 6 is a graphical representation of a rate of wire feed advancement over time, in accordance with an exemplary embodiment of the present technique.

Turning to FIG. 6, this figure represents operating of an exemplary embodiment that includes a "JOG" mode. If the welding system 10 reaches time $T_5$ without an indication that the advancing wire electrode has contacted the workpiece 14, the main control circuitry may reduce the wire feed speed to a reduced value, regardless of the setting on the wire feed control input 38. Moreover, if the system does not sense contact of the wire electrode with the workpiece a desired period after time $T_5$, as represented by reference numeral 122, system 10 may deactivate itself, thus stopping the advancement of wire electrode, disabling the SCR assembly 64, and stopping the flow of shielding gas, as represented at reference numeral 124. Indeed, if the system has been inadvertently left on, this JOG mode prevents unwanted waste of wire electrode and shielding material. The system may be taken out of this JOG mode by releasing and again depressing the trigger 24, for example, to reset the system 10.

Finally, it should be noted that the foregoing control scheme may be employed on many different types of welding systems via what will essentially be a change in their control algorithm or software. Accordingly, the present invention also contemplates an algorithm or code, fixed in a tangible, machine readable form for implementing the control scheme. In a particular application this will typically be in memory preconfigured or loaded in the welding system and utilized by the controller during execution of its weld-control functions. Any suitable memory circuitry may be employed, and the algorithm may even be downloaded to upgrade or retrofit the welder to perform the improved arc initiation control by changing the data stored in the memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling a welding operation comprising:
controlling a voltage applied to a welding electrode in an open-loop manner, and maintaining a substantially constant firing angle and an elevated wire feed speed during an initial arc initiation stage of operation; and
transitioning control of the voltage applied to the welding electrode to closed-loop voltage control, and allowing a greater variation of the firing angle and reducing wire feed speed following the initial arc initiation stage of operation.

2. The method of claim 1, wherein the voltage is controlled during the initial arc initiation stage based upon a level set by an operator.

3. The method of claim 1, wherein the voltage is controlled both during the initial arc initiation stage of operation and thereafter by controlling timing of switching of at least one solid state switch by reference to a zero-crossing of a supplied AC waveform.

4. The method of claim 1, wherein during the initial arc initiation stage of operation a first voltage is applied to the welding electrode during a first initial stage prior to arcing between the electrode and a workpiece, and a second lower voltage is applied after detection of arcing, both the first and second voltages being applied in an open-loop manner.

5. The method of claim 1, further comprising, during the initial arc initiation stage, regulating wire feed speed of the electrode at a first speed and a second, higher speed respectively before and after detection of contact between the electrode and a workpiece.

6. The method of claim 5, wherein the first and second feed speeds are based upon an operator set feed speed.

7. The method of claim 1, wherein after the transition to closed-loop voltage control the voltage applied to the welding electrode is held between two limits set based upon the voltage applied during the initial arc initiation stage.

8. The method of claim 1, wherein the voltage applied to the electrode during the initial arc initiation stage is derived from a setting provided by an operator.

9. A method for controlling a welding operation comprising:
receiving an initiating signal;
controlling switching of solid state switches and maintaining a relatively constant firing angle to provide a desired output voltage to a welding electrode in an open-loop manner and maintaining an elevated wire feed speed upon receipt of the initiating signal;
sensing contact between the electrode and a workpiece;
upon contact between the electrode and the workpiece, controlling switching of the solid state switches to provide a second, lower voltage to the welding electrode in an open-loop manner; and
transitioning control switching of the solid state switches of the voltage applied to the welding electrode to closed-loop voltage control and allowing a greater variation of the firing angle and reducing wire feed speed following the initial arc initiation stage of operation.

10. The method of claim 9, wherein the solid state switches are SCRs and their switching is controlled based upon a firing angle as measured from a zero-crossing of an input AC waveform.

11. The method of claim 9, further comprising, during the initial arc initiation stage, regulating wire feed speed of the electrode at a first speed and a second, higher speed respectively before and after detection of contact between the electrode and a workpiece.

12. The method of claim 11, wherein the first and second feed speeds are based upon an operator set feed speed.

13. The method of claim 9, wherein after the transition to closed-loop voltage control the voltage applied to the welding electrode is held between two limits set based upon the voltage applied during the initial arc initiation stage.

14. The method of claim 9, wherein the voltage applied to the electrode during the initial arc initiation stage is derived from a setting provided by an operator.

15. A welding system comprising:
a source of welding electrode wire;
a power supply;
a welding torch coupled to the source of welding electrode wire via a welding cable, wherein the torch controls advancement of the electrode wire towards a workpiece during a welding operation; and
a controller for regulating operation of the power supply to apply power to the electrode wire via the torch, the controller being configured to control a voltage applied to an electrode wire in an open-loop manner and maintain a substantially constant firing angle during an initial arc initiation stage of operation, and to transition control of the voltage applied to the electrode wire to closed-loop voltage control and allow a greater variation of the firing angle following the initial arc initiation stage of operation.

16. The system of claim 15, wherein the voltage is controlled during the initial arc initiation stage based upon a level set by an operator.

17. The system of claim 15, wherein the power supply includes a plurality of solid state switches, and wherein the controller is configured to control voltage controlled both during the initial arc initiation stage of operation and thereafter by controlling timing of switching the solid state switches by reference to a zero-crossing of a supplied AC waveform.

18. The system of claim 15, wherein after the transition to closed-loop voltage control the voltage applied to the welding electrode wire is held between two limits set based upon the voltage applied during the initial arc initiation stage.

19. A tangible, machine readable memory storing instructions for performing a welding operation including:
controlling a voltage applied to a welding electrode in an open-loop manner and maintaining a substantially constant firing angle and an elevated wire feed speed during an initial arc initiation stage of operation; and
transitioning control of the voltage applied to the welding electrode to closed-loop voltage control and allowing a greater variation of the firing angle and reducing wire feed speed following the initial arc initiation stage of operation.

20. A tangible, machine readable memory storing instructions for performing a welding operation including:
controlling switching of solid state switches to provide a desired output voltage to a welding electrode in an open-loop manner upon receipt of an initiating signal;
upon sensed contact between the electrode and the workpiece, controlling switching of the solid state switches and maintaining a substantially constant firing angle to provide a second, lower voltage to the welding electrode in an open-loop manner; and
transitioning control switching of the solid state switches of the voltage applied to the welding electrode to closed-loop voltage control and allow a greater variation of firing angle following the initial arc initiation stage of operation.

* * * * *